(12) United States Patent
Chappell et al.

(10) Patent No.: US 12,034,619 B2
(45) Date of Patent: Jul. 9, 2024

(54) UPSTREAM SIGNAL LEAKAGE DETECTION IN HIGH-SPLIT CABLE NETWORK

(71) Applicant: VIAVI SOLUTIONS INC., Chandler, AZ (US)

(72) Inventors: Daniel K. Chappell, Chandler, AZ (US); Adam D. Gray, Chandler, AZ (US); Brett Emsley, Chandler, AZ (US); Loren R. Eggert, Chandler, AZ (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 0 days.

(21) Appl. No.: 17/811,676

(22) Filed: Jul. 11, 2022

(65) Prior Publication Data
US 2024/0015088 A1    Jan. 11, 2024

(51) Int. Cl.
| | |
|---|---|
| *H04L 43/08* | (2022.01) |
| *H04L 12/28* | (2006.01) |
| *H04L 43/045* | (2022.01) |
| *H04L 43/0823* | (2022.01) |

(52) U.S. Cl.
CPC ...... *H04L 43/0823* (2013.01); *H04L 12/2801* (2013.01); *H04L 43/045* (2013.01)

(58) Field of Classification Search
CPC ............... H04L 43/0823; H04L 43/045; H04L 12/2801
USPC ....................................................... 375/228
See application file for complete search history.

(56) References Cited

U.S. PATENT DOCUMENTS

| | | | | |
|---|---|---|---|---|
| 5,983,139 A | * | 11/1999 | Zierhofer | ............... H03H 17/06 607/56 |
| 6,385,262 B1 | * | 5/2002 | Gustafsson | ............ H04B 1/406 455/150.1 |
| 6,396,531 B1 | * | 5/2002 | Gerszberg | .......... H04N 21/4532 348/14.05 |

(Continued)

OTHER PUBLICATIONS

Chrostowski, J., et al., "Detecting and Measuring Upstream Leakage Levals in a One Gpbs Symmetrical High Split Hybrid Fiber Coax Network", SCTE-ISBE Cable-Tec Expo Virtual Experience, pp. 28, (Oct. 12-15, 2020).

(Continued)

*Primary Examiner* — Kevin M Burd
(74) *Attorney, Agent, or Firm* — DLA Piper LLP (US)

(57) ABSTRACT

A CMTS may instruct one or more cable modems to transmit an upstream test signal with a particular preamble (and or any other type of signature) in the upstream transmission bandwidth. The preamble may be within a significant band of the upstream transmission bandwidth. A leakage detection device may be brought in the vicinity of the cable network to listen for various signals. The leakage detection device may filter received signals to retain the portions thereof within a desired limited band and further filter the band-limited signals to reduce noise, e.g., removing the payload following the preamble. A correlation filter in the leakage detection device may compare the pattern in the band-limited filtered signal with a stored preamble. If there is a match, the leakage detection device may generate an indication that leakage is detected in the upstream transmission.

17 Claims, 5 Drawing Sheets

(56) References Cited

U.S. PATENT DOCUMENTS

2014/0269198 A1* 9/2014 Ray ................ G01S 3/808
  367/123
2021/0135755 A1* 5/2021 Zinevich .......... H04B 10/25752

OTHER PUBLICATIONS

Data-Over-Cable Service Interface Specifications, CCAPTM Operations Support System Interface Specification, pp. 703, (May 10, 2017).

* cited by examiner

UPSTREAM SIGNAL LEAKAGE DETECTION IN HIGH-SPLIT CABLE NETWORK

BACKGROUND

Cable systems have long been used to serve content to individual customers. For example, cable systems provide broadband Internet and cable television content to households and businesses. At the basic level, a cable system includes a cable modem termination system (CMTS)—also known as a head-end—that is connected to multiple cable modems within the customers' premises. There is a two-way communication between the CMTS and the cable modems. For example, there may be control signals passing between the CMTS and the cable modems and cable television content passing from the CMTS to the cable modems.

Cable systems have historically been low-split systems, in which the upstream transmission bandwidth is between 5 MHz to 65 MHz and the downstream transmission bandwidth is between 85 MHz to 1 GHz. To increase the upstream bandwidth, high-split systems have been proposed, in which the upstream bandwidth is between 5 MHz to 204 MHz and downstream bandwidth is between 250 MHz to 1200 MHz. In the lows-split systems, the downstream transmission bandwidth contains the 130 MHz band, which is significant because of its use by aircraft communication systems, durable medical equipment (DME), etc. Therefore, a leakage on the 130 MHz band should be minimized to avoid interfering with the important communication channels in the 130 MHz band. The Federal Communications Commission (FCC) has strict regulations as to the amount of leakage that a CMTS is allowed in this band. Leakage detection in the downstream transmission bandwidth is easier from a technical point of view: the CMTS can broadcast a test signal that can be detected at different points in the cable system by a leakage detection device, which is typically carried by a technician travelling in a vehicle. Conventionally, a 130 MHz test signal was provided in the downstream transmission bandwidth, and the test signal was detected and analyzed (e.g., to determine the amplitude) by the leakage detection device.

In the high split-system, however, the 130 MHz band is within the upstream bandwidth and a CMTS cannot broadcast a downstream test signal in this band. To compound the problem, cable modems may have a different path to the CMTS and an upstream leakage may be at a particular path. A leakage detection device in transit may not traverse the path and therefore miss the path where the leakage occurs. The leakages therefore may remain undetected and unmitigated.

As such, a significant improvement on leakage detection in the upstream transmission bandwidth of high-split cable systems is therefore desired.

SUMMARY

Embodiments disclosed herein may solve the aforementioned technical problems and provide other solutions as well. In a cable network, a CMTS may instruct one or more cable modems to transmit an upstream test signal with a particular preamble (and or any other type of signature) in the upstream transmission bandwidth. The preamble may be within a significant band (e.g., 130 MHz) of the upstream transmission bandwidth. A leakage detection device may be brought in the vicinity of the cable network to listen for various signals. The leakage detection device may filter received signals to retain the portions thereof within a desired limited band and further filter the band-limited signals to reduce noise, e.g., by removing the payload following the preamble. A correlation filter in the leakage detection device may compare the pattern in the band-limited filtered signal with a stored preamble. If there is a match, the leakage detection device may generate an indication that leakage is detected in the upstream transmission. The embodiments further provide circuitry for detecting false positives. Other embodiments provide an interface that displays a spatially hierarchical configuration of the cable modems vis-à-vis the CMTS- and allow a selected subset of the cable modems to transmit the preamble in the upstream transmission bandwidth.

In an embodiment, a leakage detection device for detecting upstream signal leakage in a cable network is provided. The leakage detection device may include a first set of filters configured to remove a portion of a received signal to generate a band-limited signal, the removed portion being outside of a frequency band for an orthogonal frequency division multiple access (OFDMA) upstream data profile (OUDP) burst in an upstream communication from at least one cable modem to a cable modem termination system (CMTS). The leakage detection device may further include a second set of filters configured to reduce a level of noise in the band-limited signal and generate a filtered band-limited signal. The leakage detection device may additionally include a correlation filter configured to compare the filtered band-limited signal with a stored OUDP preamble, wherein, in response to the filtered band-limited signal matching the stored OUDP preamble, the leakage detection device is configured to determine that the received signal comprises an upstream leaked signal.

In another embodiment, a method of detecting upstream signal leakage in a cable network is provided. The method may include removing, by a first set of filters of a leakage detection device, a portion of a received signal to generate a band-limited signal, the removed portion being outside of a frequency band for an OUDP burst in an upstream communication from at least one cable modem to a CMTS. The method may also include reducing, by a second set of filters of the leakage detection device, a level of noise in the band-limited signal to generate a filtered band-limited signal and comparing, by a correlation filter of the leakage detection device, the filtered band-limited signal with a stored OUDP preamble. The method may further include, in response to the filtered band-limited signal matching the stored OUDP preamble, determining, by the leakage detection device, that the received signal comprises an upstream leaked signal.

In yet another embodiment, a system is provided. The system includes a CMTS connected to a plurality of cable modems through a plurality of cables. The CMTS may include at least one computing device that is configured to communicate with the plurality of cable modems; display a spatially hierarchical configuration of the plurality of cable modems and the plurality of cables; receive a selection of a subset of the plurality of cable modems to transmit corresponding upstream signals containing a preamble; and instruct the subset of the plurality of cable modems to transmit the corresponding upstream signals based on receiving the selection.

BRIEF DESCRIPTION OF THE DRAWINGS

It should be understood that these drawings are merely for explaining example embodiments and therefore are not limiting.

DETAILED DESCRIPTION OF SEVERAL EMBODIMENTS

The proposed high-split cable networks have FCC regulated frequencies (e.g., 130 MHz band) in the upstream band. In the conventional low-split cable networks where the regulated frequencies are in the downstream band, leakage detection is significantly easier: the CMTS may broadcast a signal (e.g., a chirp signal) that may be picked up by a traveling leakage detection device. The problem becomes significantly challenging in the upstream band: there is no "broadcast" in the upstream band because of the many-to-one connection from the cable modems to the CMTS. Furthermore, the paths from the cable modems to the CMTS are complex and the traveling leakage detection device can fail to detect the leakage.

Embodiments disclosed herein solve these and other technical problems. In particular, a leakage detection device may include a field programmable gate array (FPGA) that may filter a signal received from the vicinity of the cable network. The signal may comprise an orthogonal frequency division multiple access (OFDMA) upstream data profile (OUDP) burst. The FPGA may narrow the frequency band of the signal and reduce the level of noise. The band-limited noise reduced signal may be compared to a known preamble at a correlation filter. A match indicates that leakage has been detected. A false detection may reduce the number of false positives. Furthermore, an interface may be provided that shows a spatially hierarchical configuration of the cable network that may allow the CMTS to selectively instruct the cable modems to transmit the preamble upstream based on locations of one or more leakage detection devices.

Figure 1:
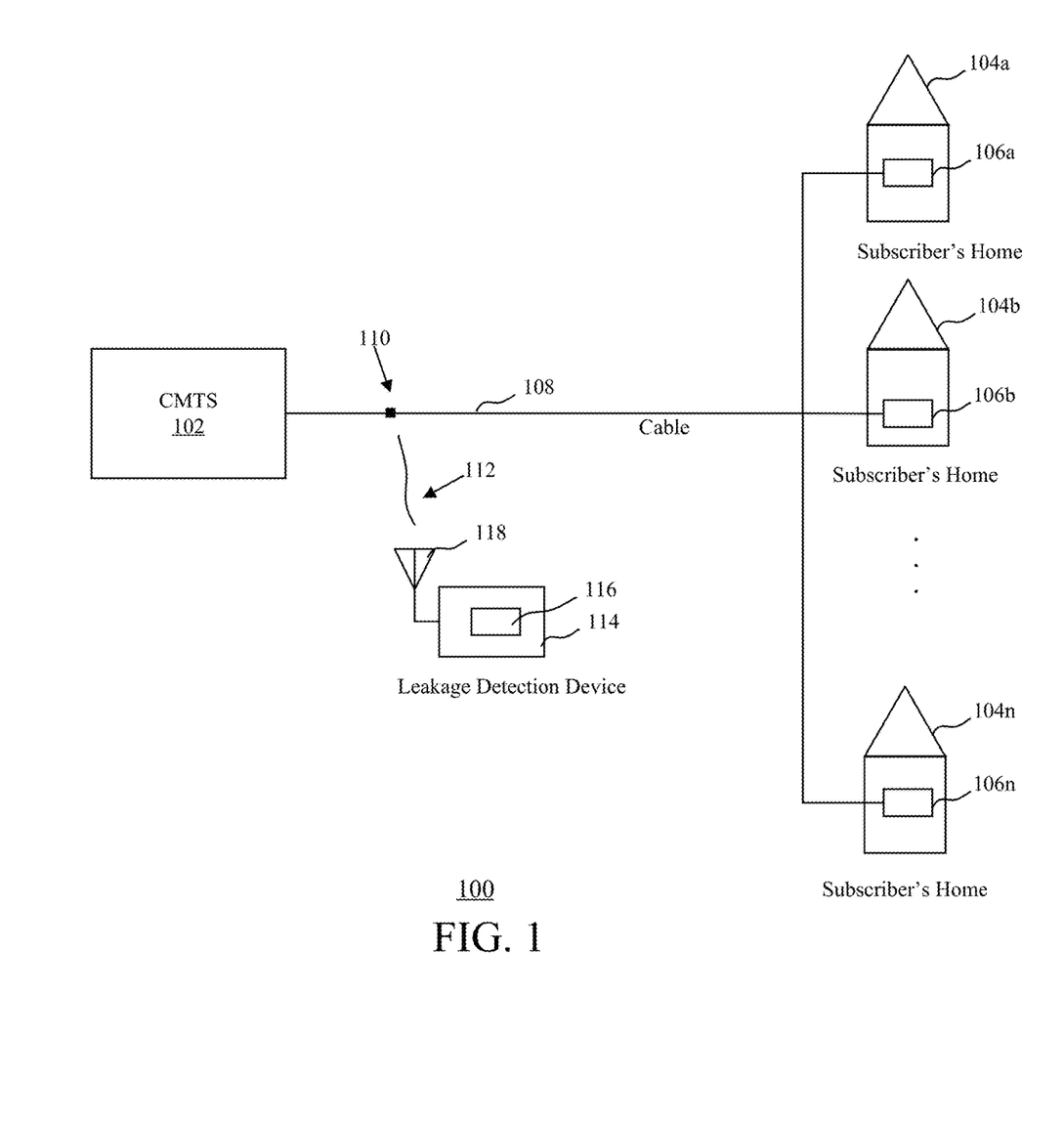
FIG. 1 shows an example leakage detection environment based on the principles disclosed herein.

FIG. 1 shows an example leakage detection environment 100 based on the principles disclosed herein. The leakage detection environment 100 may include a cable modem termination system (CMTS), also known as a head-end, 102 connected to multiple cable modems 106a-106n (collectively referred to as cable modems 106 and individually referred to as a cable modem 106) in subscriber's homes 104a-104n (collectively referred to as subscriber's homes 106 and individually referred to as a subscriber's home 104) through a cable 108 (although a single cable is shown in the illustrated example, the environment 100 may include multiple cables with varying degrees of interconnections). The subscribers may include households and businesses consuming content provided by the CMTS 102 through the cable modems 106. The content may include, for example, broadband Internet, cable television, and the like. Within the environment 100, a leakage detection device 114 may detect an electromagnetic leakage signal 112 generated at a leakage point 110 within the cable 108. It should, however, be understood that the components of the environment 100 shown in FIG. 1 and described herein are merely examples and an environment with additional, alternative, or fewer number of components should be considered within the scope of this disclosure.

The CMTS 102 may include computing systems, databases, application software, and or any other type of components that may communicate with the cable modems 106 within the subscriber's homes 104. The communications may include downstream content (e.g., cable television programming) from the CMTS 102 to the cable modems 106 and upstream content (e.g., user data and control signals) from the cable modems 106 to the CMTS 102. The components of the CMTS 102 may further keep track of all the cable modems 106, monitor their statuses, and or perform other administrative functions for the environment 100 to run properly.

In normal operation, the communications between the CMTS 102 and the cable modems 106 are supposed to run through the cable 108. The communication signals, however, may inevitably leak as electromagnetic radiation 112. For example, the cable 108 may have a crack, another type of deformity, and or a loose connection that may form the leakage point 110. In other examples, the shape and structure of a cable may undesirably behave as a transmission antenna at the leakage point 110. Leakage may interfere with other forms of radio frequency communications. For example, in a high-split cable system, a significant band of 130 MHz may be within an upstream transmission bandwidth. The 130 MHz band is significant because it is used by aircraft communication systems and durable medical equipment. Other frequencies may be used by other communication systems and leakages may adversely affect these communication systems. The Federal Communications Commission (FCC), which regulates the communication frequency spectrum, has strict maximum allowed leakages for significant frequency bands such as 130 MHz. It is therefore desirable that the leakages be minimized.

The leakage detection device 114 may be used to detect the leakages. Typically, the leakage detection device 114 may include an antenna 118 that may detect the leaked electromagnetic signal 112. The leakage detection device 114 may further include electronic components such as a field programmable gate array (FPGA) that may analyze the detected signals. For instance, the FPGA may determine the frequency bandwidth and or power (e.g., measured in terms of amplitude) of the leaked electromagnetic signal 112. In a typical use case, the leakage detection device 114 may be held by a technician driving in a vehicle in the vicinity of the environment (e.g., in the vicinity of the cable 108). The leakage detection device 114 may generate an indication (e.g., audible, visual, and or haptic) when the electromagnetic signal 112 is detected. The technician may use the indication to further investigate and analyze the leakage.

In an example, the leakage detection device may detect whether the leaked electromagnetic signal has a particular preamble. The preamble may be within upstream test signals (e.g., OUDP signals) generated by one or more cable modems 106 based on instructions received from the CMTS. The preamble may have a particular signature, e.g., a digital preamble may have a particular sequence of bits, which may be used to determine whether a detected signal is the electromagnetic leakage signal 112 within a frequency band of interest. For this determination, the FPGA 116 within the leakage detection device 114 may perform several operations using corresponding components. An initial set of filters may band-limit the received signal to a certain frequency band of interest. Another set of filters may reduce the noise in the signal. A correlation filter may compare the pattern in the band-limited noise reduced signal with a stored pattern. If the patterns match, the leakage detection device 114 may generate an indication that leakage has been detected.

Figure 2:
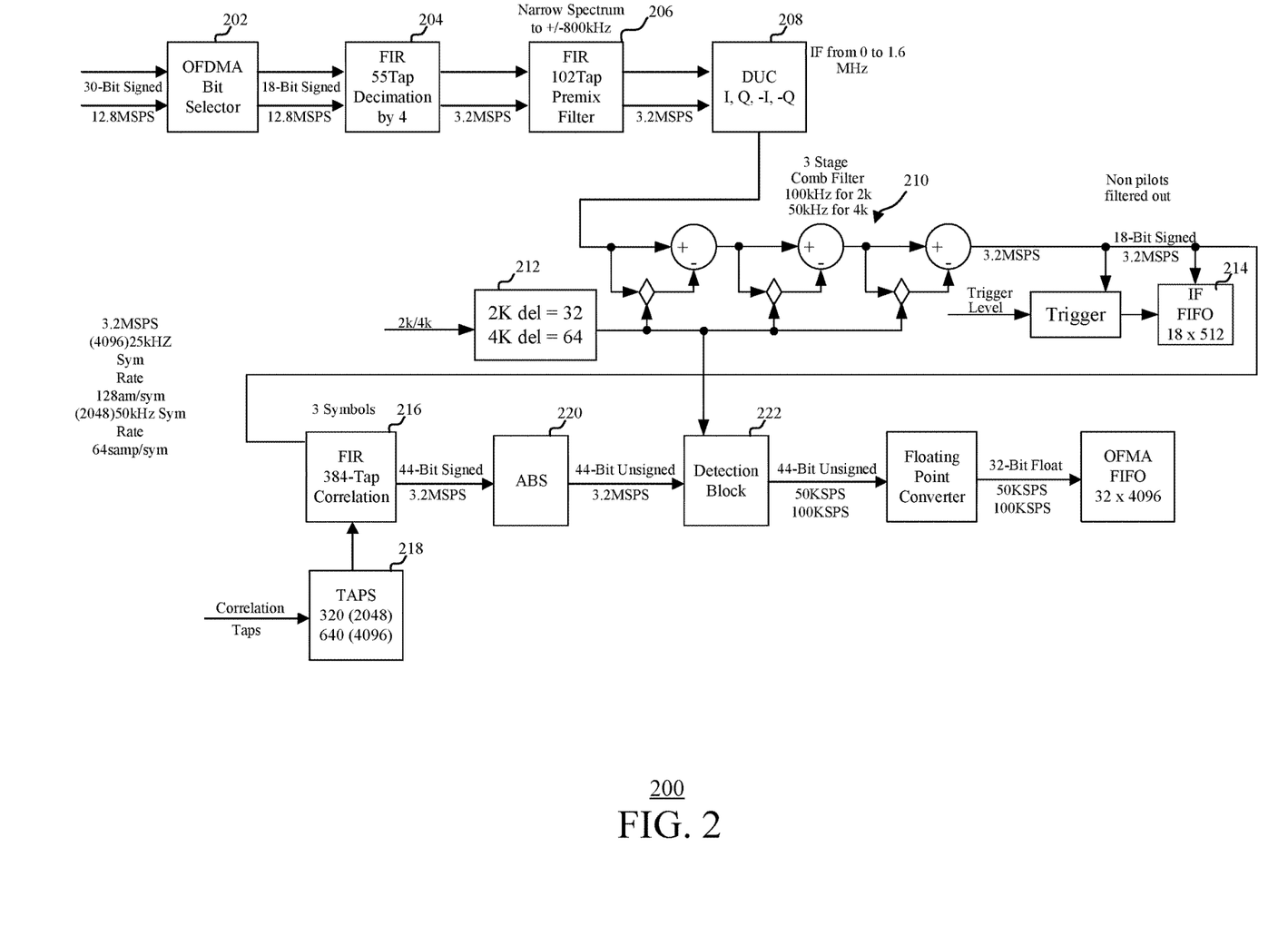
FIG. 2 shows an example architecture for leakage detection based on the principles disclosed herein.

FIG. 2 shows an example architecture 200 for leakage detection based on the principles disclosed herein. It should be understood that architecture 200 and the components thereof are just examples, and architectures with additional, alternative, or a fewer number of components should be considered within the scope of this disclosure. Generally, the architecture 200 may use digital signal processing (DSP) to compare a preamble (e.g., an OUDP preamble) of a received signal with a stored preamble (e.g., by digitally comparing the corresponding coefficients). Particularly, the architecture 200 may capture a 6 MHz wide signal and detect whether a known preamble is within the detected signal. The architecture 200 may be implemented in a field programmable gate array (FPGA) or similar circuitry and or logic within an antenna alignment device.

The preamble is defined by the DOCSIS standard and is within a data packet transmitted upstream by cable modems. The upstream transmission may be in response to a CMTS instructing the corresponding cable modems. The principles disclosed herein may use the preamble, which has a known pattern, for comparison and ignore the payload part (that follows the preamble) of the data packet. As described herein, the preamble may comprise an OUDP pattern.

An OFDMA bit selector 202 may select the corresponding OFDMA bits from an incoming 30-bit signed signal (i.e., the baseband signal). The incoming 30-bit signed signal may be detected by a leakage detection device. The detected signal may be within the packets sent by modems (e.g., household modems) to a CMTS. Using the bit select control signal, the OFDMA bit selector 202 may select 18 bits of the detected signal and transfer the selected bits to an FIR filter 204. The selection may be based on which of the bits provide the most dynamic range.

The FIR filter 204 may include a 55 tap filter that may decimate the received signal (i.e., 18-bit signed signal from the OFDMA bit selector 202) by a factor of 4. In other words, for each set of 4 samples in the received signal, the output may be one sample. Therefore, based on the decimation, an input of 12.8 Msps (mega samples per second) may be reduced by a factor of 4 to an output of 3.2 Msps. The decimation may be performed to reduce the computation and memory costs of the downstream operations. The decimated samples may then be provided to another FIR filter 206.

The FIR filter 206 may narrow the spectrum of the received upstream signal. For instance, the FIR filter 206 may use 102 taps to narrow the spectrum of the received upstream signal (e.g., from the FIR filter 204) to about 1.6 MHz (+/−800 KHz). The narrow-band signal (also referred to as a band-limited signal) may then be provided to a digital up converter (DUC) 208. The DUC 208 may convert the received baseband signal (i.e., concentrated around 0 Hz/KHz/MHz frequency) to an intermediate frequency (IF) signal that may be concentrated around 1.6 MHz.

The IF signal may be passed through a 3-stage comb filter 210 to remove extraneous information in the upstream test signal. For example, the 3-stage comb filter 210 may remove the payload (i.e., the actual data) that accompanies the preamble. The actual data may contain noise that may have to be removed for a correct comparison of the received preamble with the stored preamble (generally with 1.6 MHz bandwidth). Furthermore, the actual data may have different information for every data packet, and the continuously changing information may not be relevant for the preamble comparison- and may potentially corrupt the correlation performed by downstream components (e.g., correlation filter 216). The extraneous information may also include aliasing and or other types of distortion introduced into the signal in the previous stages (e.g., aliasing introduced due to digital up conversion).

Within the preamble, there may be a sub-carrier at every 50 KHz. The carrier may include for example, a binary phase shift keying (BPSK) carrier. The preamble may include about 2048 sub-carriers—and for each sub-carrier there may be a pilot with a known pattern. When the pilots are combined, a larger known pattern—comprising predetermined phases and amplitudes of the pilot signals—is generated that may be used for the comparison described throughout this disclosure. The comb filter 210 removes the data carriers (from the payload portion of the data packet) and preserves the information of the sub-carriers and the pilots therein.

As shown, for a 2k FFT size, the comb filter 210 may operate with a band-pass frequency spacing of 100 KHz and for a higher 4k FFT size, the comb filter 210 may operate with a band-pass frequency spacing of 50 KHz. A selection signal 212 may control a selection between 2k (100 KHz) and 4k (50 KHz). The selection is for the comb filter 210 to attenuate the data carriers and not attenuate the pilot sub-carriers. The signal filtered by the comb filter 210 may be fed to an intermediate frequency (IF) first in first out (FIFO) 214.

The signal filtered by the comb filter 210 may be fed to a FIR correlation filter 216. The FIR correlation filter 216 may compare the signal received from the comb filter with known taps 218 (e.g., an expected combination of pilots). As shown, the known taps 218 may correspond to either 2048 (2k) fast Fourier transform (FFT) (320 taps) or 4096 (4k) FFT (640 taps). The comparison may be fed through an absolute value function 220 and to a detection block 222. For example, the detection block 222 may include a maximum value filter, which may extract maximum values of 32 samples for a 2k FFT and a maximum of 64 samples for a 4k FFT. The maximum value filter is just an example and other forms of calculations and or comparisons should be considered within the scope of this disclosure.

The detection block 222 may further allow for minimizing false detections, which may be based on detecting specific repeating patterns in the signals coming out of the correlation filter 216. The repeating patterns may be based on cyclic prefixes, e.g., repeating prefixes. For example, there may a 20 microsecond burst of a prefix and the first 5 microseconds may be copied and added at the end of the 20 microseconds burst, thereby making the burst 25 microseconds long. The first 5 microseconds and the second 5 microseconds therefore become cyclic. The 5 microseconds for the cyclic prefix is just an example and this time may be tuned as desired. The cyclic prefixes cause sharp local peaks separated by certain amounts at the correlation filter 216. The detection block 222 may compare the repeating patterns of sharp local peaks, e.g., the relative locations and the relative amplitudes of the local peaks. The local peaks may come in groups of three, and the intra-group spacing, inter-group spacing, intra-group amplitudes, and inter-group amplitudes may be analyzed. If a known pattern is detected, the detection block 222 may indicate a positive preamble detection. This additional layer of pattern matching may reduce the number of false positives when detecting the preamble.

Other downstream components may be used to further refine (e.g., using a floating point converter) or store (e.g., using an OFDMA FIFO) the result of the analysis block 222.

Figure 3A:
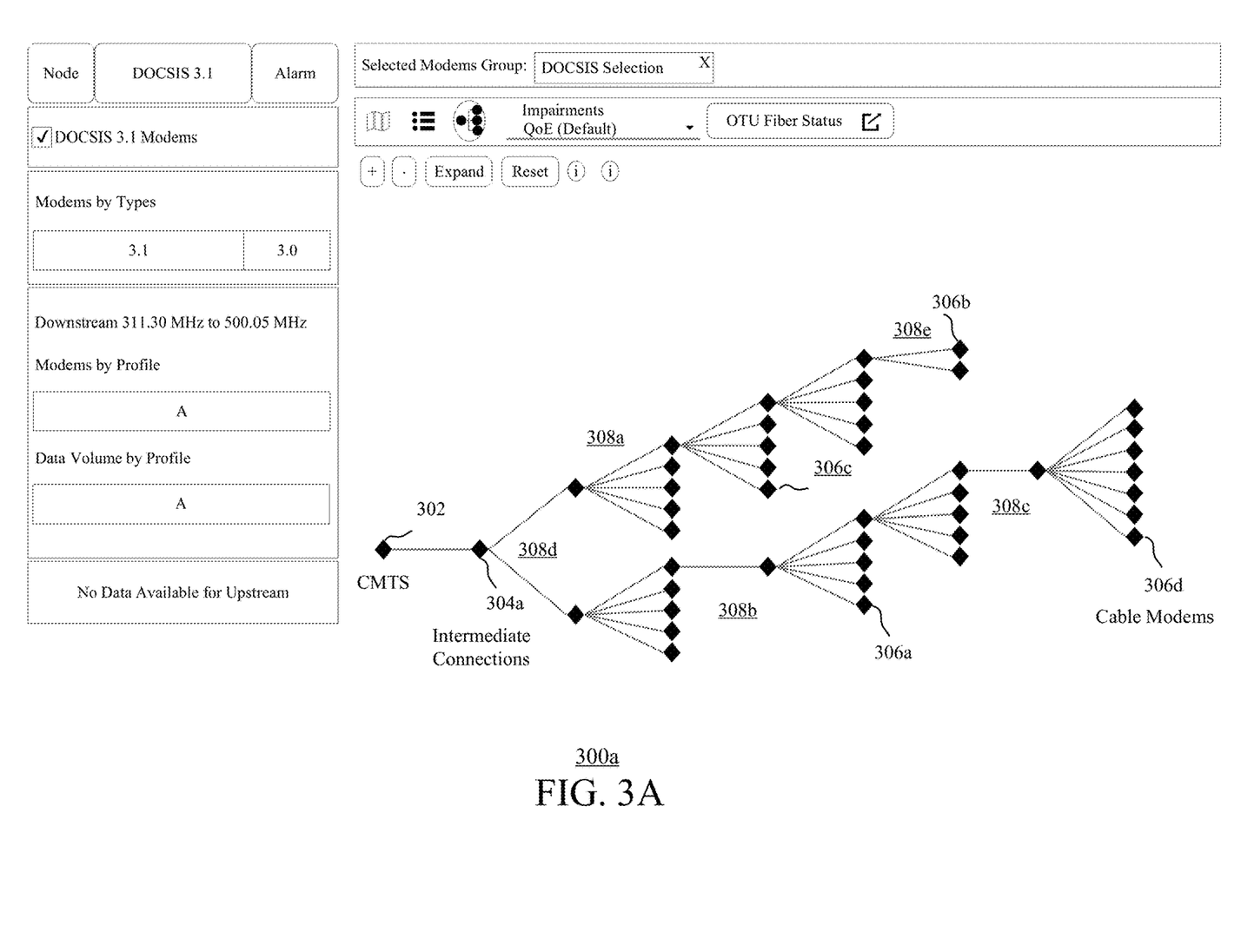
FIG. 3A shows an example interface showing a cable network configuration that may be used for leakage detection based on the principles disclosed herein.

FIG. 3A shows an example interface 300a showing a cable network configuration that may be used for leakage detection based on the principles disclosed herein. The interface 300a may be displayed in a computing device associated with a CMTS 302. For instance, the interface 300a may be displayed in a computing device on the premises of the CMTS 302 and or a mobile computing device (e.g., laptop computer, tablet computer) of a user (e.g., a technician) associated with the CMTS.

The configuration shown in the interface 300a may include CMTS 302, intermediate connections (an example labeled as 304a, also known as a split), and terminal cable modems (examples labeled as 306a-306d, collectively referred to as cable modems 306 and commonly referred to as cable modem 306). The configuration shown in the interface 300a therefore allows a spatially hierarchical snapshot view of the cable network, showing how the different components are arranged within the cable network. For instance, the spatially hierarchical snapshot view may map locations of the cable modems 306 and the interconnection between the cable modems 306 and the CMTS 302. This spatially hierarchical view may allow for an efficient upstream leakage detection. This efficiency may be based on the CMTS 302 instructing a cable modem 306 or a subset of cable modems 306 to send an upstream signal with the preamble. To detect whether the upstream signal with the preamble is leaking, one or more leakage detection devices may be deployed at locations 308a-308e (collectively referred to as locations 308 and individually referred to as a location 308). For example, one leakage detection device may traverse through the locations 308 and or more than one leakage detection devices may deployed at corresponding locations 308. Therefore, the upstream transmission of the signal with the preamble may be configured by the CMTS such that the likelihood of the leakage detection by a leakage detection device at particular locations 308 may be increased. Because the traveling leakage detection devices may have a short time window for a particular location 308, the interface 300a may allow for an optimal placement (e.g., in the particular location 308) for the leakage detection device with an optimal amount of sensitivity to detect a leakage at that location.

For example, if the leakage detection device is at location 308d, the CMTS may instruct any of the cable modems 306a, 306b, 306c, 306d to transmit the preamble upstream because it is likely that the signal with the preamble will pass through a cable in the vicinity of the location 308d. But if the leakage detection device is at location 308e, leakage detection device may only detect the leakage from the cable modems at the far end (e.g., cable modem 306b), therefore the CMTS 302 may instruct the cable modem 306b to transmit the signal with the preamble. Similarly, if the leakage detection device is at location 308c, the CMTS 302 may instruct the cable modem 306d to transmit the signal with the preamble upstream. For the location 308a, the CMTS 302 may instruct any of the cable modems 306c, 306b to transmit the signal with the preamble upstream. For the location 308b, the CMTS 302 may instruct any of the cable modems 306a, 306d to transmit the signal with the preamble upstream. These are just but a few examples of how efficiency is achieved for leakage detection by selecting appropriate cable modems 306 to transmit the signal with the preamble. Therefore, any permutation of the cable modems 306 that are instructed to transmit the signal with the preamble upstream depending upon the locations 308 of the leakage detection devices should be considered within the scope of this disclosure.

In some embodiments, the interface 300a may allow—from the interface 300a itself—for a user at CMTS 302 to activate a subset of cable modems 306. For instance, the icons showing the cable modems 306 may be selectable (e.g., using a mouse or a touchscreen) and the selected cable modems 306 may transmit the signal with the preamble upstream. The interface 300a may further track the locations 308 of the leakage detection devices in real-time such that the personnel at the CMTS 302 may have a full view of the cable network structure and the locations 308 of the leakage detection devices.

Figure 3B:
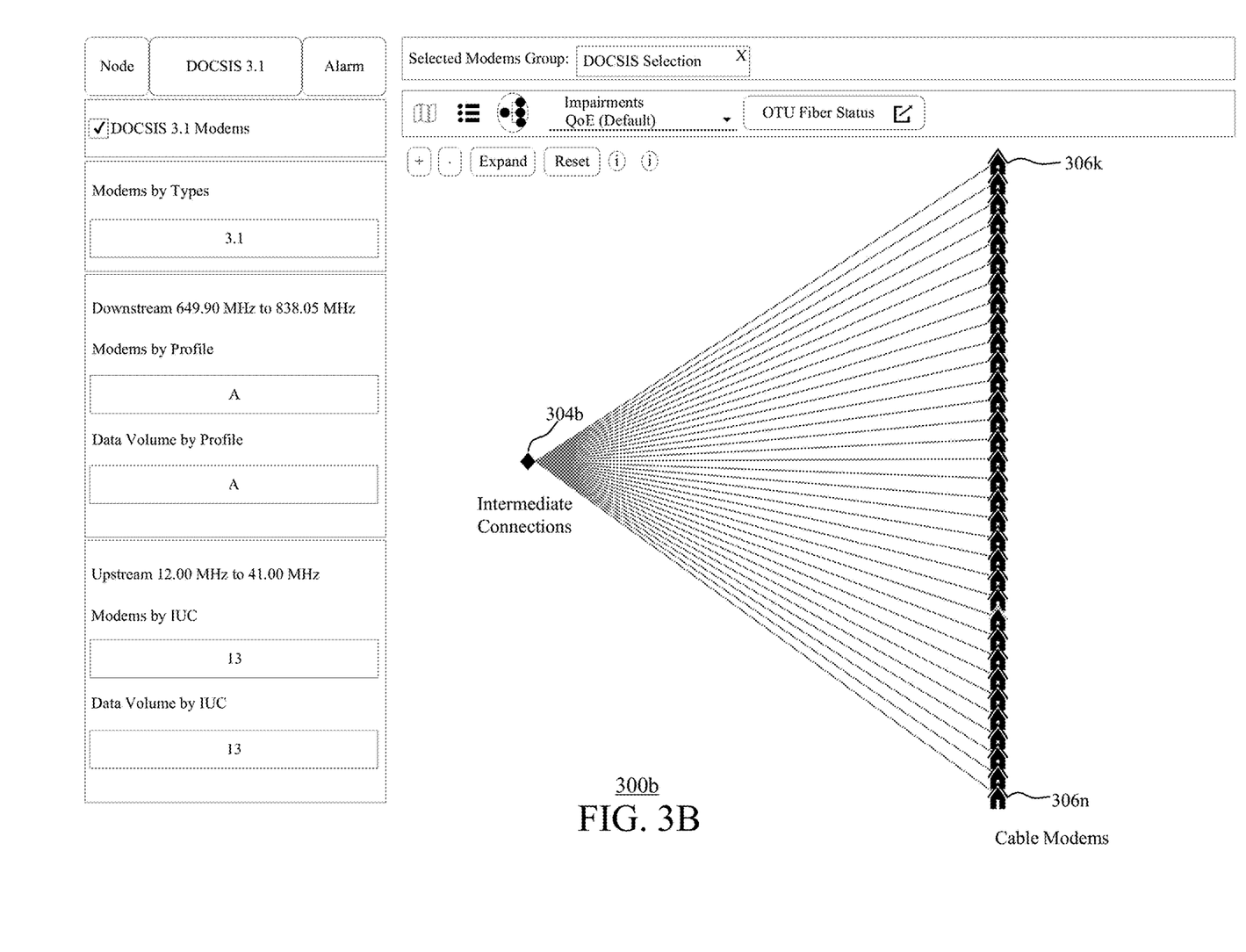
FIG. 3B shows another example interface showing a portion of a cable network configuration that may be used for leakage detection based on the principles disclosed herein.

FIG. 3B shows another example interface 300b showing a portion of a cable network configuration that may be used for leakage detection based on the principles disclosed herein. The interface 300b may allow a snapshot view of a portion of the cable network shown in the interface 300a. Particularly, the interface 300b may show an intermediate node 304b (which may be similar to the intermediate node 304a shown in the interface 302a) connected to a plurality of cable modems 306k-306n. The interface 300b may therefore allow a user to "zoom in" on a portion of a larger cable network (e.g., containing the CMTS 302 and all the cable modems 306 serviced by the CMTS 302). The interface 300b may further allow a group selection of the cable modems 306: the user may select a plurality of modems 306k-306n to transmit the signal with the preamble upstream.

It should, however, be understood that the above interfaces 300a, 300b are merely intended as examples; and any kind of interface that provides a view of the cable network configuration with any level of detail should be considered within the scope of this disclosure. Furthermore, any type of interface that allows a user to select one or more cable modems for transmitting the signal with the preamble upstream should also be considered within the scope of this disclosure.

Figure 4:
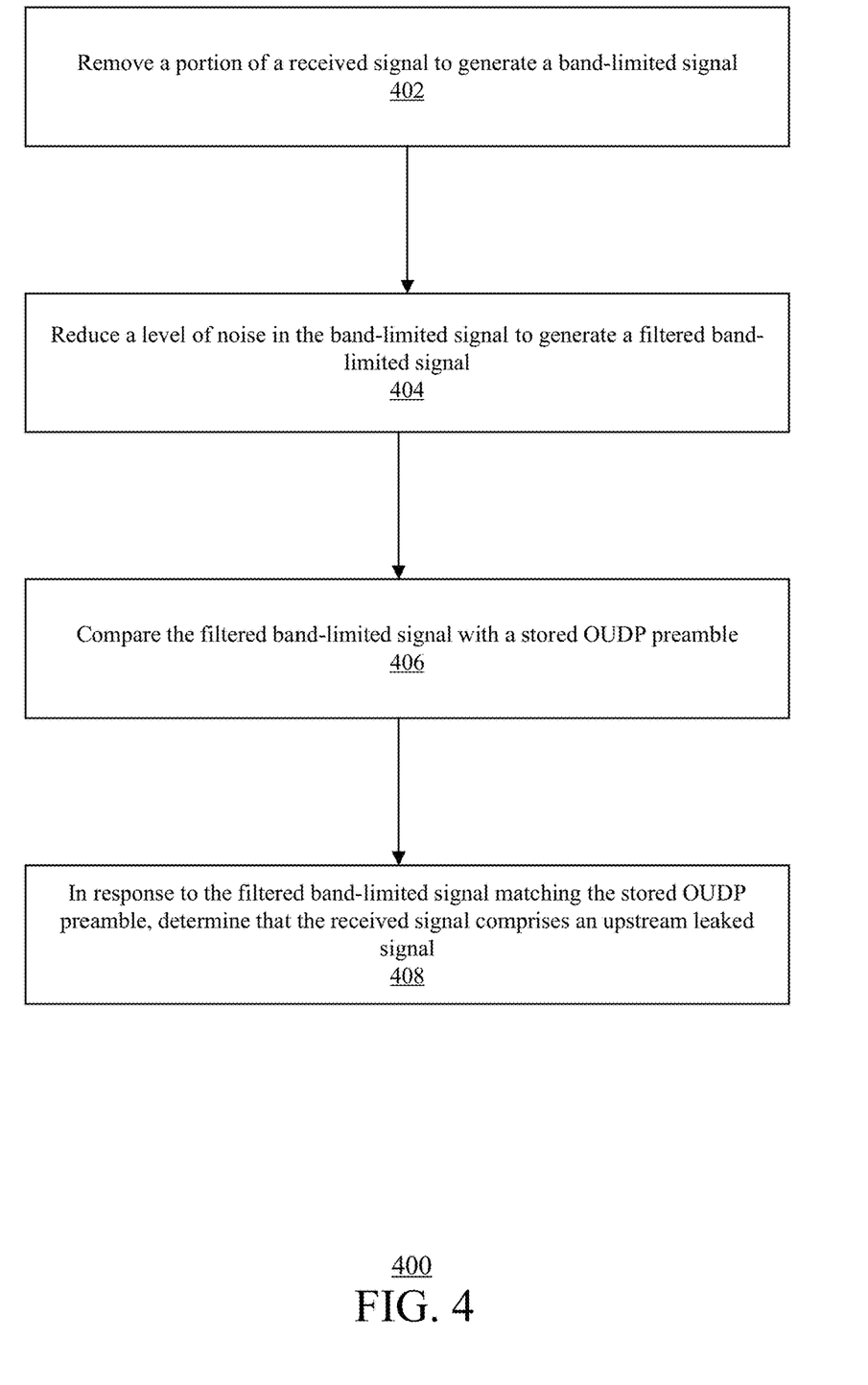
FIG. 4 shows a flow diagram of an example method of leakage detection based on the principles disclosed herein.

FIG. 4 shows a flow diagram of an example leakage detection method 400 based on the principles disclosed herein. It should be understood that the steps of the method 400 are merely examples and methods with additional, alternative, and or fewer number of steps should be considered within the scope of this disclosure.

At step 402, a portion of a received signal may be removed to generate a band-limited signal. The removal may be performed by a first set of filters of a leakage detection device. The removed portion may be outside of a frequency band for an OUDP burst in an upstream communication from at least one cable modem to a CMTS. At step 404 a level of noise in the band-limited signal may be reduced to generate a filtered band-limited signal. The noise reduction may be performed by a second set of filters of the leakage detection device. At step 406, the filtered band-limited signal may be compared to a stored OUDP preamble. The comparison may be performed by a correlation filter of the leakage detection device. At step 408, it may be determined that the received signal comprises an upstream leaked signal in response to the filtered band-limited signal matching the stored OUDP preamble. In response to this determination, the leakage detection device may visually display that a leakage has been detected in its graphical user interface.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A leakage detection device for detecting upstream signal leakage in a cable network:
    the leakage detection device configured to receive an upstream signal from at least one of a manually selected subset of a plurality of a hierarchically organized cable modems, the manual selection causing the subset of the cable modems to transmit corresponding upstream signals containing a preamble, the leakage detection device comprising:
    a bit selector configured to select a subset of bits from the received upstream signal to generate a bit-selected upstream signal;
    a first set of filters configured to remove a portion of the bit-selected upstream signal to generate a band-limited signal, the removed portion being outside of a frequency band for an orthogonal frequency division multiple access (OFDMA) upstream data profile (OUDP) burst in the received upstream signal;
    a second set of filters configured to reduce a level of noise in the band-limited signal and generate a filtered band-limited signal; and
    a correlation filter configured to compare the filtered band-limited signal with a stored OUDP preamble, wherein, in response to the filtered band-limited signal matching the stored OUDP preamble, the leakage detection device is configured to determine that the received upstream signal comprises an upstream leaked signal.

2. The leakage detection device of claim 1, wherein the frequency band comprises 130 MHz band.

3. The leakage detection device of claim 1, wherein the first set of filters comprises a first finite impulse response (FIR) filter configured to decimate sampling of the bit-selected upstream signal.

4. The leakage detection device of claim 3, wherein the first set of filters comprises a second FIR filter configured to narrow the frequency band of the decimated sampling of the bit-selected upstream signal to generate the band-limited signal.

5. The leakage detection device of claim 1, wherein the second set of filters comprises a plurality of comb filters.

6. The leakage detection device of claim 1, wherein the second set of filters comprises a three-stage comb filter.

7. The leakage detection device of claim 1, further comprising:
    a graphical user interface configured to indicate that leakage has been detected.

8. The leakage detection device of claim 1, wherein the first set of filters, the second set of filters, and the correlation filter are located in a single field programmable gate array (FPGA).

9. The leakage detection device of claim 1, further comprising:
    false positive minimization circuitry configured to detect an additional pattern in the received upstream signal to minimize false positives in the determination that the received upstream signal comprises the upstream leaked signal.

10. A method of detecting an upstream signal leakage in a cable network, the method comprising:
    receiving a manual selection of a subset of a plurality of hierarchically organized cable modems in a cable network to transmit corresponding upstream signals containing a preamble;
    receiving, by a leakage detection device, an upstream signal;
    selecting, by a bit selector, a subset of bits from the received upstream signal to generate a bit-selected upstream signal;
    removing, by a first set of filters of the leakage detection device, a portion of the bit-selected upstream signal to generate a band-limited signal, the removed portion being outside of a frequency band for an orthogonal frequency division multiple access (OFDMA) upstream data profile (OUDP) burst in the received upstream signal;
    reducing, by a second set of filters of the leakage detection device, a level of noise in the band-limited signal to generate a filtered band-limited signal;
    comparing, by a correlation filter of the leakage detection device, the filtered band-limited signal with a stored OUDP preamble; and
    in response to the filtered band-limited signal matching the stored OUDP preamble, determining, by the leakage detection device, that the received upstream signal comprises an upstream leaked signal.

11. The method of claim 10, wherein the frequency band comprises 130 MHz band.

12. The method of claim 10, wherein the first set of filters comprises a first finite impulse response (FIR) filter, the method further comprising:
    decimating, by the first FIR filter, sampling of the bit-selected upstream signal.

13. The method of claim 12, wherein the first set of filters comprises a second FIR filter, the method further comprising:
    narrowing, by the second FIR filter, the frequency band of the decimated sampling of the bit-selected upstream signal to generate the band-limited signal.

14. The method of claim 10, wherein the second set of filters comprises a plurality of comb filters.

15. The method of claim 10, wherein the second set of filters comprises a three-stage comb filter.

16. The method of claim 10, further comprising:
    indicating, by a graphical user interface of the leakage detection device, that leakage has been detected.

17. The method of claim 10, further comprising:
    detecting, by false positive minimization circuitry, an additional pattern in the received upstream signal to minimize false positives in the determination that the received upstream signal comprises the upstream leaked signal.

\* \* \* \* \*